(12) United States Patent
Westphal et al.

(10) Patent No.: US 9,568,724 B2
(45) Date of Patent: Feb. 14, 2017

(54) AUTOFOCUS METHOD FOR MICROSCOPE AND MICROSCOPE COMPRISING AUTOFOCUS DEVICE

(75) Inventors: Peter Westphal, Jena (DE); Reiner Mitzkus, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 210 days.

(21) Appl. No.: 14/123,871

(22) PCT Filed: Jun. 5, 2012

(86) PCT No.: PCT/EP2012/060605
§ 371 (c)(1),
(2), (4) Date: Apr. 10, 2014

(87) PCT Pub. No.: WO2012/168244
PCT Pub. Date: Dec. 13, 2012

(65) Prior Publication Data
US 2015/0309297 A1  Oct. 29, 2015

(30) Foreign Application Priority Data

Jun. 8, 2011 (DE) .......................... 10 2011 077 236

(51) Int. Cl.
*G02B 21/36* (2006.01)
*G02B 21/24* (2006.01)
(Continued)

(52) U.S. Cl.
CPC .............. *G02B 21/365* (2013.01); *G02B 7/28* (2013.01); *G02B 21/02* (2013.01); *G02B 21/244* (2013.01); *G02B 21/245* (2013.01)

(58) Field of Classification Search
CPC ..... G02B 21/361; G02B 21/18; G02B 21/362; G02B 21/22; G02B 21/0088; G02B 21/244; G02B 21/241; G02B 21/002; G02B 7/102; G02B 21/365; G02B 21/245; G02B 7/28; G02B 21/02; B82Y 20/00; B82Y 15/00; H04N 5/23212; H04N 5/23293; H04N 5/23219; G03B 13/36
(Continued)

(56) References Cited

U.S. PATENT DOCUMENTS 4,725,722 A 2/1988 Maeda et al.
5,604,344 A 2/1997 Finarov
(Continued)

FOREIGN PATENT DOCUMENTS

WO WO 98/45745 A1 10/1998
WO WO 2004/038483 A1 5/2004
WO WO 2007/144197 A1 12/2007

*Primary Examiner* — Bumsuk Won
*Assistant Examiner* — Henry Duong
(74) *Attorney, Agent, or Firm* — Christensen Fonder P.A.

(57) ABSTRACT

A microscope including an objective having a focal plane in a sample space, and an autofocus device comprising a light modulator for generating a luminous modulation object that is intensity-modulated periodically along one direction, an autofocus illumination optical unit that images the modulation object such that its image arises in the sample space, an autofocus camera, an autofocus imaging optical unit that images the image of the modulation object in the sample space onto the autofocus camera, a control device, which receives signals of the autofocus camera and determines an intensity distribution of the image of the modulation object and generates a focus control signal therefrom. The control device determines an intensity distribution of the image of a luminous comparison object imaged by the optical unit to correct the intensity distribution of the image of the modulation object with regard to reflectivity variations in the sample space.

12 Claims, 9 Drawing Sheets

(51) Int. Cl.
*G02B 7/28* (2006.01)
*G02B 21/02* (2006.01)

(58) Field of Classification Search
USPC .................. 359/363; 250/201.3; 348/345
See application file for complete search history.

(56) References Cited

U.S. PATENT DOCUMENTS

| | | | |
|---|---|---|---|
| 6,376,818 B1* | 4/2002 | Wilson | G06T 7/0057 |
| | | | 250/201.3 |
| 7,488,924 B2* | 2/2009 | Bublitz | G02B 7/32 |
| | | | 250/201.3 |
| 2003/0132394 A1 | 7/2003 | Wolleschensky et al. | |
| 2006/0186311 A1* | 8/2006 | Backs | G02B 21/0004 |
| | | | 250/201.3 |
| 2007/0102620 A1 | 5/2007 | Bublitz et al. | |
| 2010/0033811 A1 | 2/2010 | Westphal et al. | |
| 2010/0294749 A1 | 11/2010 | Kempe et al. | |
| 2011/0134308 A1* | 6/2011 | Arnz | G02B 21/245 |
| | | | 348/345 |

* cited by examiner

AUTOFOCUS METHOD FOR MICROSCOPE AND MICROSCOPE COMPRISING AUTOFOCUS DEVICE

PRIORITY CLAIM

The present application is a National Phase entry of PCT Application No. PCT/EP2012/060605, filed Jun. 5, 2012, which claims priority from German Application Number 102011077236.7, filed Jun. 8, 2011, the disclosures of which are hereby incorporated by reference herein in their entirety.

FIELD OF THE INVENTION

The invention relates to a microscope with an objective, which has a focal plane lying in a sample space, and an autofocus device having a light modulator which is designed for generating a luminous modulation object that is intensity-modulated periodically along one direction, an autofocus illumination optical unit which images the modulation object such that an image of the modulation object forms in the sample space, an autofocus camera, an autofocus imaging optical unit which images the image of the modulation object formed in the sample space onto the autofocus camera, a control device which receives signals of the autofocus camera and is designed to determine an intensity distribution of the image of the modulation object and to generate a focus control signal therefrom.

The invention further relates to an autofocus method for a microscope with an objective which images a sample, wherein a luminous modulation object that is intensity-modulated periodically along one direction is imaged onto the sample such that an image of the modulation object forms there, an intensity distribution of the image of the modulation object is determined and a focus control signal is generated therefrom.

BACKGROUND OF THE INVENTION

A microscope according to the preamble and an autofocus method according to the preamble are known from WO 2007/144197 A1. This describes an autofocus device which images a modulation object that is intensity-modulated periodically along one direction into the sample and generates an autofocus signal from the image of the modulation object. Similar microscopes are found in DE 102006027836 A1 and DE 102007055530 A1.

This approach achieves very good autofocus properties, but occasionally has problems when the reflective properties of the sample vary locally, because then the image of the modulation object can be distorted by the reflection variations of the sample. In the worst case, the image of the modulation object can be altered by the object image so radically that an autofocus signal can no longer be generated.

DE 19537376 A1 uses two patterns from periodic grids, phase-shifted by 180°, in different focal planes. The patterns serve to determine direction for the autofocusing.

DE 102008005355 A1 describes the effect a reflectivity jump has on the AF contrast signal. To thereby avoid negative influences, a defocusing of the projected grating structures is proposed.

In U.S. Pat. No. 4,725,722, differently defocused grating images are subtracted from each other.

SUMMARY OF THE INVENTION

The object of the invention is to develop a microscope or an autofocus method of the type named at the beginning such that, even in the case of samples which show a reflection variation, a reliable autofocus function is obtained.

This object is achieved with a microscope of the above-mentioned type in that the light modulator additionally generates a luminous comparison object which extends along the direction of the modulation object, the autofocus illumination optical unit also images the comparison object such that an image of the comparison object forms in the sample space, the autofocus imaging optical unit also images the image of the comparison object formed in the sample space onto the autofocus camera, and the control device is designed to determine from the signals of the autofocus camera an intensity distribution of the image of the comparison object along the direction and thereby to correct the intensity distribution of the image of the modulation object with regard to reflectivity variations in the sample space.

The object is further achieved with an autofocus method of the above-mentioned type in which a luminous comparison object which extends along the direction of the modulation object is additionally imaged onto the sample such that an image of the comparison object forms there, an intensity distribution of the image of the comparison object along the direction is determined and the intensity distribution of the image of the modulation object is thereby corrected with regard to reflectivity variations of the sample.

According to the invention, a comparison object is provided which is also imaged to the sample. The intensity distribution of the image is determined along the direction of the reference object. The intensity distribution of the image of the comparison object can be used to easily correct the intensity distribution of the image of the modulation object with regard to reflectivity variations in the sample space.

The comparison object thus allows to determine reflection variations in the sample space, which could distort the imaging of the modulation object. For this, the comparison object is expediently arranged along to, in particular aside, the modulation object and, unlike the modulation object, is not intensity-modulated periodically, so that the intensity distribution of the image of the comparison object along the direction of the image of the modulation object reflects any reflection variations in the sample space.

This can be achieved particularly simply in that the comparison object has the form of a line or a rectangular field. A required lack of periodic intensity modulation can also be achieved by forming the comparison object with a fineness of structure which cannot be resolved by the microscope.

Ideally, the comparison object extends along the direction of the modulation object over precisely the same length that the modulation object has. The same is then also true for the corresponding images of these objects. The microscope or the autofocus method then allows a correction over the whole range of extension of the modulation object.

In principle, it is advantageous if the comparison object is designed such that the total intensity of the luminous comparison object is equal to that of the modulation object. This can be achieved, e.g. by the luminous surface area of the comparison object corresponding to that of the modulation object. If the luminous line or the luminous rectangular field is used as a comparison object, the width of the comparison object is preferably by a factor smaller than that of the modulation object wherein the factor equals the duty cycle of the modulation object. A further option to make the intensity of the image of the comparison object conforming as far as possible to that of the image of the modulation object is to form the comparison object as a grating slit, the grating constant of which lies below the resolution limit of the autofocus imaging optical unit. In both cases, the comparison object appears reduced in its intensity. The reduction conforms exactly to the intensity of the modulation object if duty cycle and grating slit width of modulation object and comparison object are substantially the same or the width of the comparison object is smaller by a factor equalling the duty cycle of the modulation ratio.

A further possibility for forming the comparison object is to provide additionally to the modulation object a structure that complements the modulation structure, e.g., a replica of the modulation object with a phase position shifted by 180 degrees. The comparison object is then the combination of modulation object and the complementary structure.

The imaging of comparison object and modulation object can preferably take place simultaneously. A simplification in the autofocus camera is achieved if the images are imaged sequentially and determined sequentially.

It is understood that the features mentioned above as well as those yet to be explained below can be used, not only in the stated combinations, but also in other combinations or alone, without departing from the scope of the present invention.

BRIEF DESCRIPTION OF THE DRAWINGS

The invention is explained yet more fully in the following, by way of example, with reference to the drawings. There are shown in.

DETAILED DESCRIPTION

Figure 1:
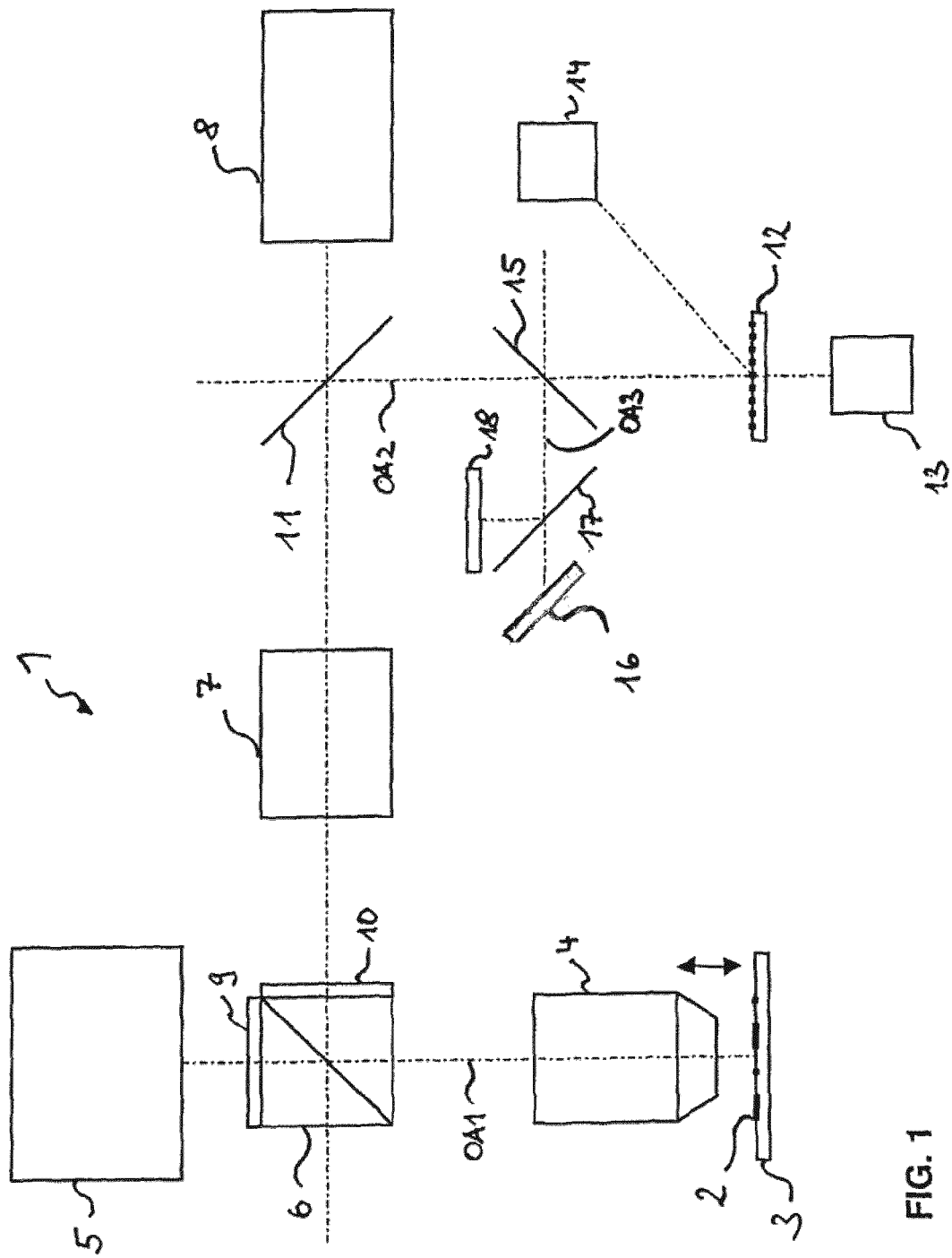
FIG. 1 a microscope with an autofocus device for reflection measurements.

FIG. 1 shows a microscope 1, with which a sample 2 which is located on a sample holder 3 is imaged by means of an objective 4 onto a detector 5. The basic structure of the microscope corresponds to that of the microscope known from WO 2007/144197 A1. This applies to the designs of FIGS. 1-7. The disclosure of this published document is therefore fully incorporated by reference herein. The difference compared with the microscopes of WO 2007/144197 A1 lies in the structure of the light modulator 12, which will be explained yet more fully in the following with reference to FIG. 8.

The representation in FIG. 1 is greatly simplified. The microscope 1 can be a widefield microscope, i.e., the detector 5 is, e.g., a camera or an eyepiece. However, any other microscope design also comes into consideration for the microscope 1, for example a laser scanning microscope.

Then, the microscope beam path is provided with another scanning device which lies on the optical axis OA1. The focal position of the objective 4 is adjustable, as indicated by the double arrow. Alternatively, the sample holder 3 can also be adjustable.

A beam splitter 6 which can optionally be dichroic or a plate-type colour splitter couples in microscope illumination radiation from a microscope illumination source 8 which illuminates the sample 2 through the objective 4 and an illumination tube lens system 7. By means of a beam splitter 11 an autofocus device is coupled into this illumination beam path. The autofocus device has a light modulator 12 which is illuminated by a light source 13, for example, an LED, when operating in transmission or by a light source 14 (e.g. an LED), when operating in reflection. The illuminated light modulator 12 generates a modulation object. This is projected, i.e., imaged, to the sample 2 via the beam splitter 11, the illumination tube lens system 7, the beam splitter 6 as well as the objective 4. This realizes an autofocus illumination. The image of the modulation object generated in the sample 2 is recorded in the opposite direction by means of a camera 16 in front of which a further beam splitter 15 is located on the optical axis OA2 of the autofocus device. The thus obtained optical axis OA3 is optionally further guided onto a camera 18 via a beam splitter 17.

In an embodiment of the invention, the beam splitter 11 is dichroic, and the light source 13 or 14 emits at a wavelength which is not emitted to a significant extent by the microscope illumination source 8 or is not necessary for the sample imaging. The autofocus device thus operates in a spectral range which is not otherwise used for the imaging of the sample 2.

In the figures, generally only the image planes of the cameras are shown. The cameras can generally be CCD or CMOS cameras.

In the design of FIG. 1, the light modulator 12 and thus the modulation object lie perpendicular to the optical axis OA2. The image plane of the camera 16, on the other hand, is at an angle to the optical axis OA3. If the light modulator 12 provides for example for a spatial modulation, e.g. a striped pattern, the maximum contrast is located in a line of the camera 16 lying perpendicular to the plane of drawing. The position of the line on the camera 16 is a measure of the position of the focal plane along the optical axis, i.e., in z-direction.

With the help of the illumination tube lens system 7 and the objective 4, the modulation object which is generated by the light modulator 12 either in transmission operation (light source 13) or in reflection operation (light source 14) is imaged into the sample. The camera 16 positioned at an angle obtains a depth resolution. By means of the camera 18, a lateral shift of the sample illuminated in a structured manner can additionally be detected.

In the case of a fluorescence microscope, an excitation filter 10 and an emission filter 9 (for the fluorescence radiation) are used. Without further limitation with regard to the autofocus device, the microscope 1 can also be designed as a scanning microscope, in particular as a laser scanning microscope, Nipkow disk microscope or SPIM microscope.

Figure 2:
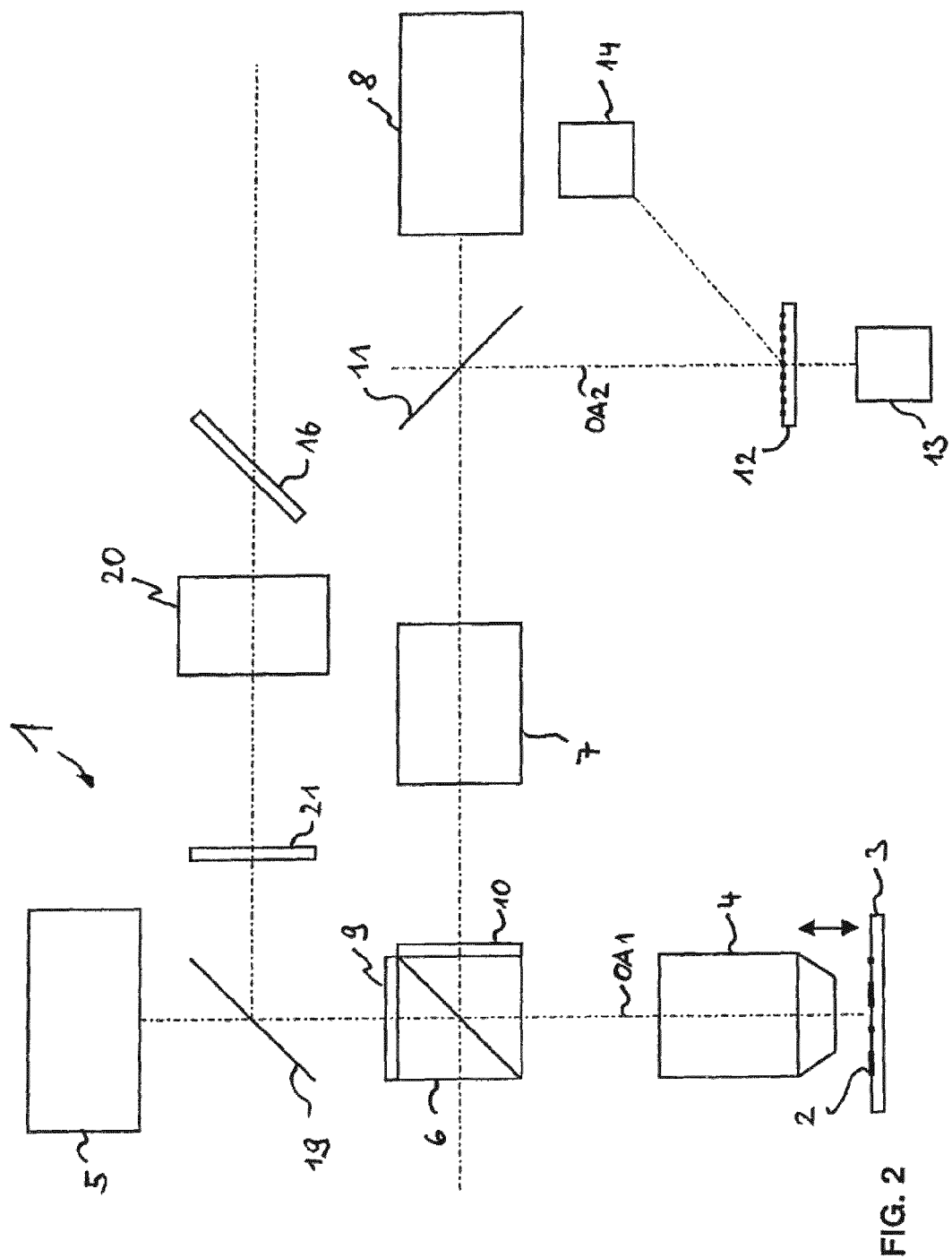
FIG. 2 a microscope with an autofocus device for fluorescence measurements.

FIG. 2 shows an alternative design of the microscope of FIG. 1 with regard to the autofocus device. In the microscope of FIG. 2, components which have already been explained with reference to FIG. 1 are provided with the same reference numbers; repeated description thereof is therefore dispensed with. The camera 16 here detects the fluorescence contrast of the sample, which can be further enhanced by the structured autofocus illumination. The imaging of the modulation object is done similarly to the design according to FIG. 1. However, the modulation image imaged to the sample 2 is not defected from the illumination beam path, but via a separate beam splitter from the microscope beam path. This splitter is adapted to the wavelength of the autofocus illumination and, e.g., is dichroic to the same extent as the beam splitter 11. In order to be able to record the modulation object imaged to the sample or reflexes or backscatterings generated thereby by means of the camera 16, the camera is preceded by a corresponding relay optical unit 20, the optical characteristics of which unit ensure that the image plane of the camera 16 intersects a plane conjugated to the modulation object, ideally close to or on the optical axis (as also FIG. 1).

The signals supplied by the auto focus device, in particular from the camera 16, are utilized for the control of a focus adjustment along the z-axis. This is illustrated schematically in FIG. 1 by a double arrow. The control device used is not shown in FIGS. 1 and 2.

If the microscope 1 of FIG. 2 is designed as a laser scanning microscope, the combination of emission filter 9 and excitation filter 10 is again provided, as well as optionally a further spectral filter 21 which ensures that the spectral range of the luminous modulation object falls onto the camera 16 and spectral ranges that are of no further interest are blocked, in particular the spectral ranges of the sample imaging.

Figure 3:
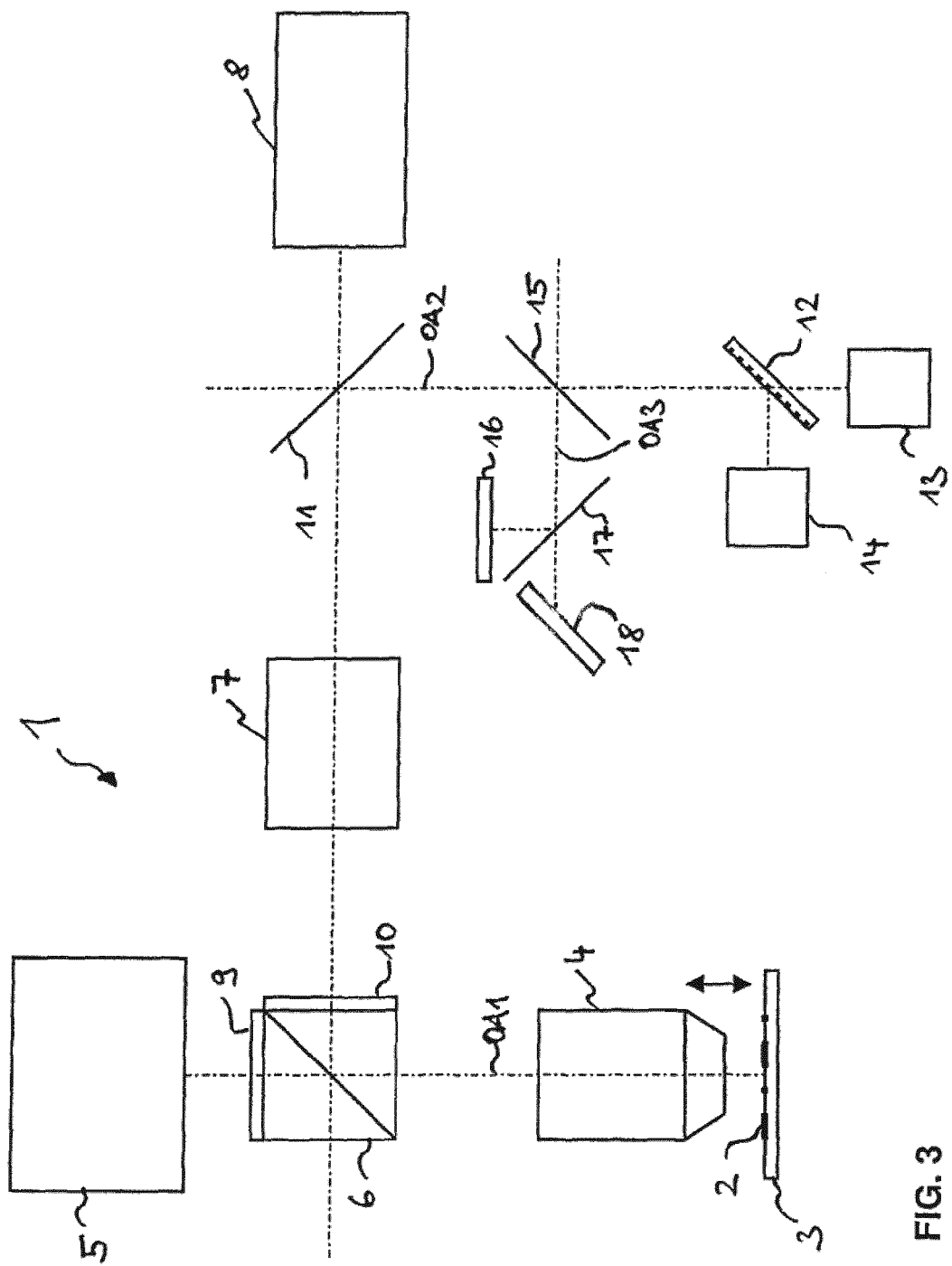
FIG. 3 a microscope similar to that of FIG. 1, adapted for samples that scatter, FIG. 4 a microscope similar to that of FIG. 1 with an increased capture range, FIG. 5 an inverted microscope with an autofocus device with reflection of the illumination between objective and filter cube, FIG. 6 an inverted microscope with an autofocus device with reflection in the microscope illumination beam path, FIG. 7 a microscope similar to that of FIG. 6, with an autofocus device in which intermediate imaging optics is arranged in front of a camera, FIG. 8 a top view of an exemplary light modulator, and FIGS. 9 to 11 contrast signals to illustrate the functioning of the autofocus device.

FIG. 3 shows an embodiment of the microscope 1 for strongly scattering and scarcely reflective samples. Elements which have already been explained with reference to FIG. 1 or 2 are not described further. They are provided with the same reference numbers in the figure.

For strongly light-scattering surfaces, such as, e.g., sections of tissue, the autofocus device is modified according to FIG. 3. This device predominantly analyses the light scattered by the sample.

In this arrangement, the two-dimensional light modulator 12 encloses an angle of between 0 degrees and 90 degrees, preferably between 20 degrees and 70 degrees, with the optical axis OA2. The light modulator 12 again corresponds to the already described design, i.e., it can be a transmission LCD, a reflection LCD, a DMD or an amplitude grating with shifting device. The structure preferably again consists of light dark stripes. The illumination of the light modulator 12 preferably comes from one or more high-power LEDs. This is also possible in FIGS. 1 and 2. In a transmission type modulator the light source 13 is provided; in a reflection type modulator the light source 14 is provided. Usual optical devices for light homogenizations and optical units for intermediate imagings can be used to generate the modulation object with the light modulator 12 and are not represented in FIG. 3 (as also in FIGS. 1 and 2) for reasons of clarity.

With the help of the illumination tube lens system 7 and the objective 4, the modulation object is imaged to the sample 2. As the light modulator 12 and thus the modulation object are not perpendicular to the optical axis, the modulation object (e.g., alternating light dark stripes) is imaged at an angle to the optical axis and thus into the depth of the sample.

The image plane of the camera 18 lies in a plane conjugated to the light modulator 12 and thus to the modulation object. It is thus tilted at the same angle to the optical axis (here the optical axis OA3) as the light modulator 12. Light scattered by the sample is hereby imaged, modulated, onto the camera 18. The contrast of the modulation object appears on camera 18 only where it is scattered by the sample. The embodiment in FIG. 2 is therefore particularly suitable for thin or non-transparent, scattering samples, for example, in technical microscopy. At the same time, the capture range is enlarged by the tilted modulation object.

For the autofocus function the autofocus device additionally has the camera 16, the image plane of which is at an angle to the light modulator 12 and thus to the modulation object, as it lies perpendicular to the optical axis OA3. It is mirrored in a 50% splitter 17 located within the autofocus beam path.

Figure 4:
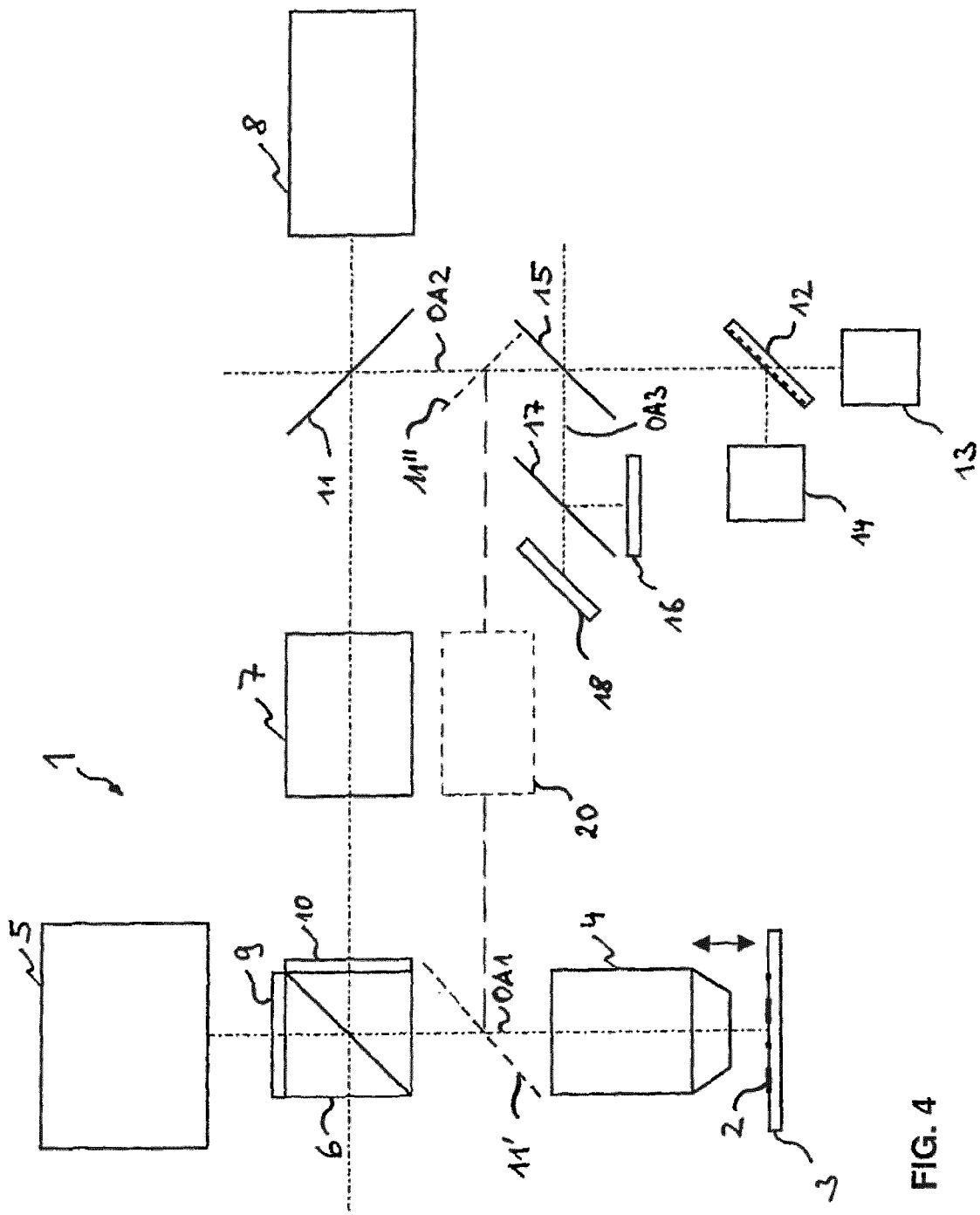

FIG. 4 shows a further modification of the microscope with regard to the autofocus device. The arrangement of FIG. 4 differs from that of FIG. 3 in that the autofocus beam path is coupled in as close as possible to the objective pupil.

This alternative is possible in principle for all designs of the autofocus device and provides a separate dichroic beam splitter 11' in the microscope beam path which couples in the radiation of the light modulator 12 and guides the representation of the modulation object imaged to the sample onto the camera 16 or 18. In the representation of FIG. 4, the beam splitter 11 is then dispensed with in this design. Instead, a reflecting mirror 11" is optionally provided. The coupling in also takes place via the beam splitter 11 by means of an optional optical unit 20 which generates a possibly necessary intermediate imaging and guarantees that the modulation object, i.e., the illuminated light modulator 12, lies in a plane conjugated to the focal plane of the objective 4, therefore the modulation object is imaged through the objective 4 into the sample 2. This concept is described later with reference to FIG. 7 in another variant.

The design drawn in as an alternative by way of example in FIG. 4 has the advantage that the autofocus device can operate very reliably simultaneous with all current microscopy processes. In particular, for the modulation object, i.e., the illumination of the light modulator 12, it is possible to use radiation the wavelength of which lies above the wavelengths used for the microscopy processes. In fluorescence or transmitted light measurements, a wavelength range above 700 nm, preferably above 800 nm, can be used for the autofocus device. An additional spectral filter in front of the camera or cameras can effectively suppress potentially interfering light of the microscope illumination.

The designs of FIGS. 1 to 4 show the arrangement of the autofocus device in an upright microscope 1 with an object slide as a sample holder. A cover glass, as well as an immersion fluid (e.g., oil, water, glycerol), can be located between object slide and objective. However, this is not essential. There are thus two cases of application to be differentiated: The highest grating contrast of the air/gas boundary surface on the top side of the cover glass or of the object slide is obtained without immersion fluid. The highest grating contrast of the boundary surface between the underside of the cover glass and the embedding medium is obtained with immersion fluid. To suppress scattered light or undesired reflexes, diaphragms, e.g., semicircular diaphragms, can be introduced into the autofocus beam path.

The beam splitter 11 or 11' can be a plane-parallel glass sheet which has an anti-reflexion coating on one side, to preventing interfering secondary images. The side of the glass sheet serving to reflect the autofocus signal can also have a dichroic coating which increases the reflectivity for the long-wave autofocus light (if the variant with long-wave autofocus illumination is used) and predominantly transmits the shorter-wave useful light of the microscopy (e.g., fluorescence radiation). Naturally, other spectral partitions are also possible.

Figure 5:
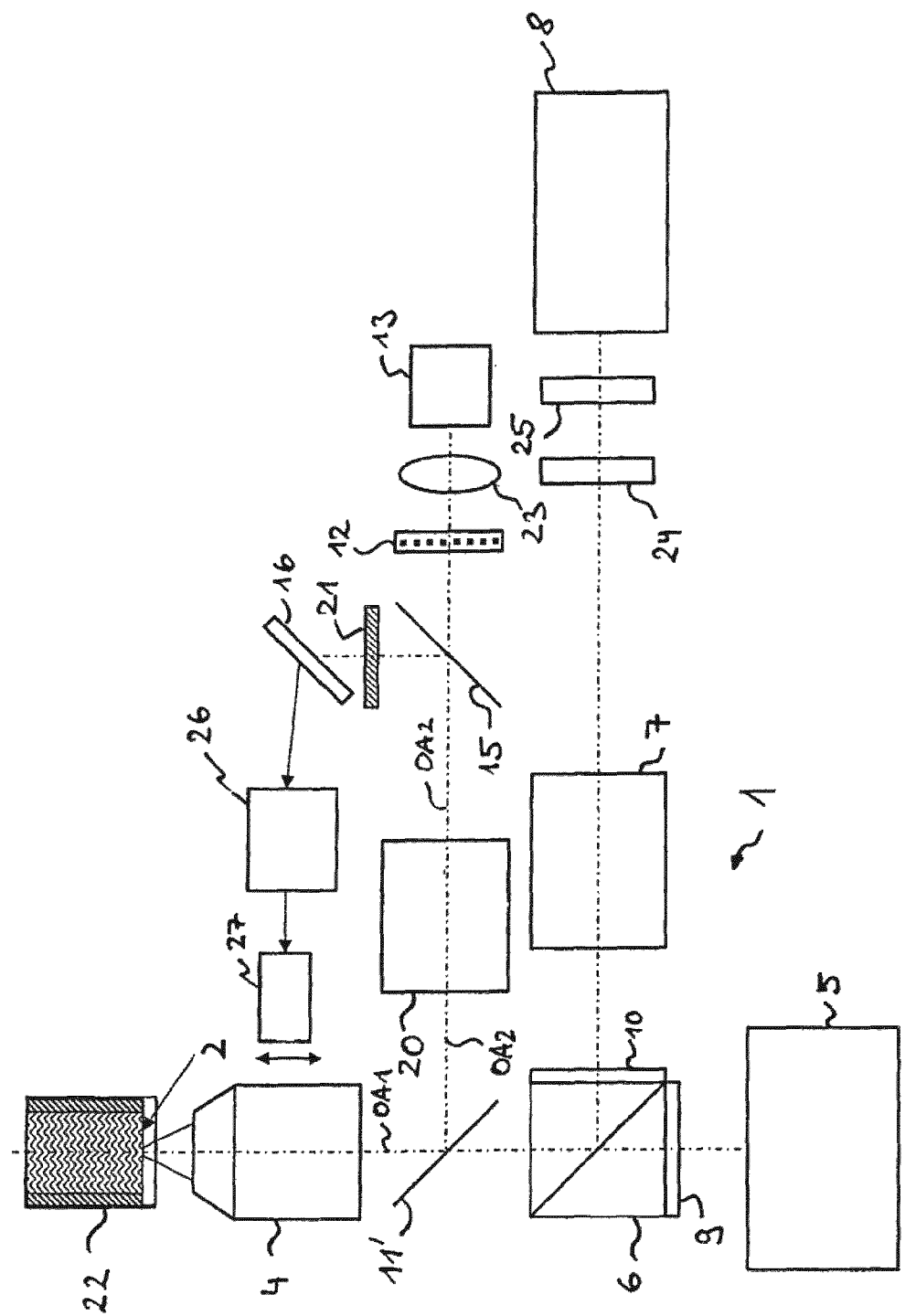

FIG. 5 shows an inverted microscope 1 with an autofocus device according to the invention. Such inverted microscopes are predominantly used to read titer plates which have cuvettes 22 with liquids which cuvettes open to the top. The glass/liquid boundary surface of the titer plate base (or close to it), where cells usually adhere, is usually to be focused to. As these cells impair the contrast of the projected grating, i.e., of the modulation object, at least ten lines of the two-dimensional camera 16 are preferably evaluated in this design. The contrast signal can thereby be averaged over a larger number of lines, which substantially improves the measurement accuracy. Again, air or an immersion fluid can be provided between objective 4 and titer plate base, and what has already been said above applies analogously. The only difference is that, instead of the embedding medium, there is a spacious liquid column above the sample in the cuvette 22.

The autofocus device in the design of FIG. 5 is again coupled into the microscope beam path via its own dichroic beam splitter 11', and not into the illumination beam path. Otherwise, what has already been said applies analogously. In addition, the optional spectral filter 21 is also shown in FIG. 5. The illumination optical unit 23 is also represented by way of example for generating the modulation object from the light modulator 12. For a homogeneous illumination of the light modulator 12, the illumination optical unit 23 preferably also contains a diffusion disc. An illumination optical unit 23 can be used in all embodiments described.

FIG. 5 further shows that the signals of the camera 16 are fed to a control device 26 which carries out corresponding calculations and, among other things, controls the already mentioned z-drive 27 for adjusting the focal position. Naturally, the control device 26 is in most applications also connected to the light modulator 12, if this is controllable. The same applies to the light source 13 or 14. The control device 26 and the elements connected can also be present in the designs according to FIGS. 1 to 4.

Figure 6:
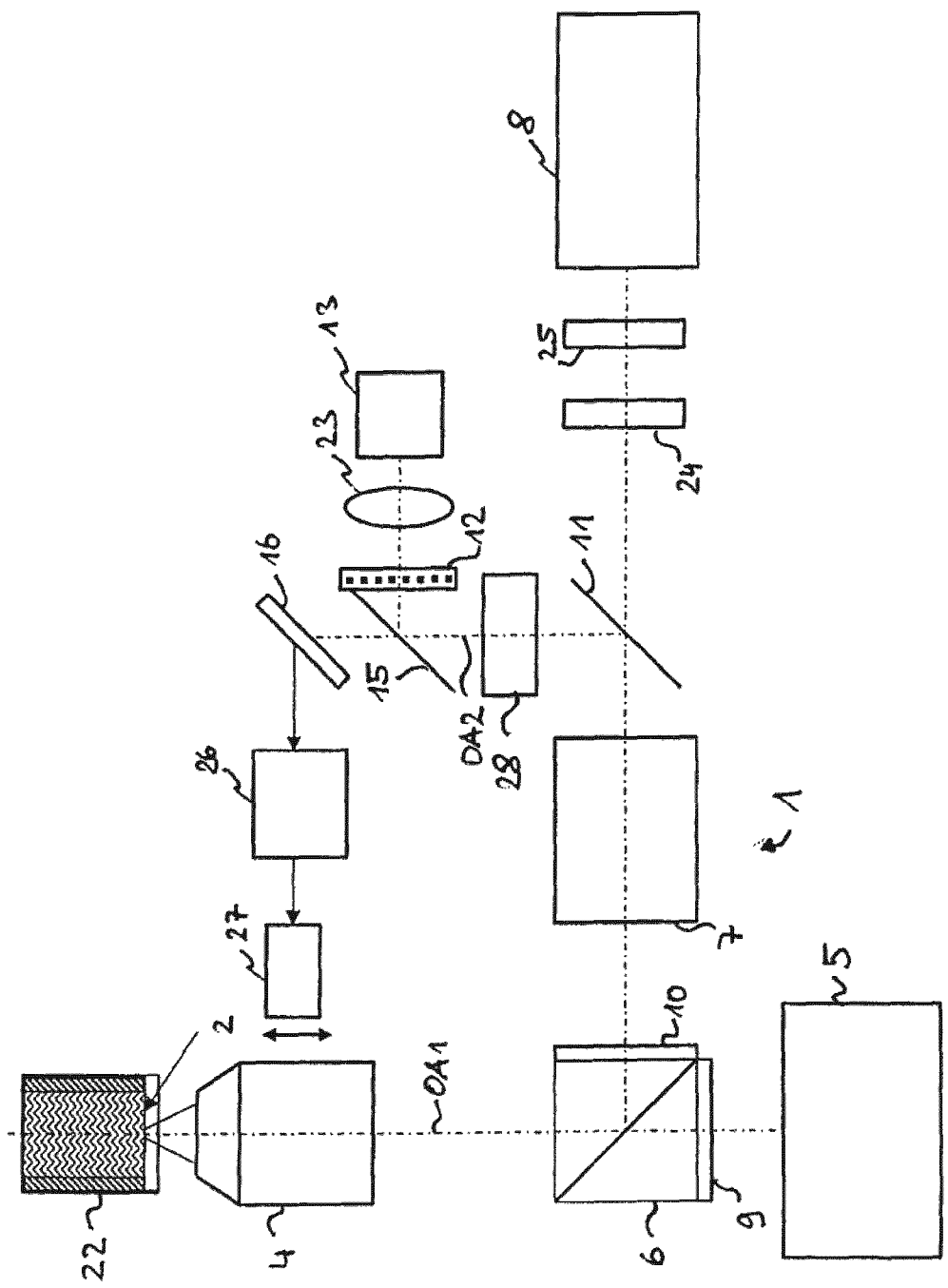

FIG. 6 shows a modification of the design of FIG. 5. Here, the autofocus device is mirrored into the illumination beam path via the beam splitter 11 analogously to the design of FIG. 1. The separate optical unit 20 can be dispensed with, as no autofocus illumination tube lens system is necessary then; its function is fulfilled by the illumination tube lens system 7. In addition, in FIG. 6 optional filters 24 and 25 in the illumination beam path are also shown. The coupling in via the beam splitter 11 also follows in the imaging direction of the modulation object, a demagnification optical unit 28 which influences the capture range of the autofocus device and thus makes its ideal design possible. The optical units 7, 20 and 28 can also be designed as (motorized) varifocal optical units, in order to compensate for different objective magnifications.

Figure 7:
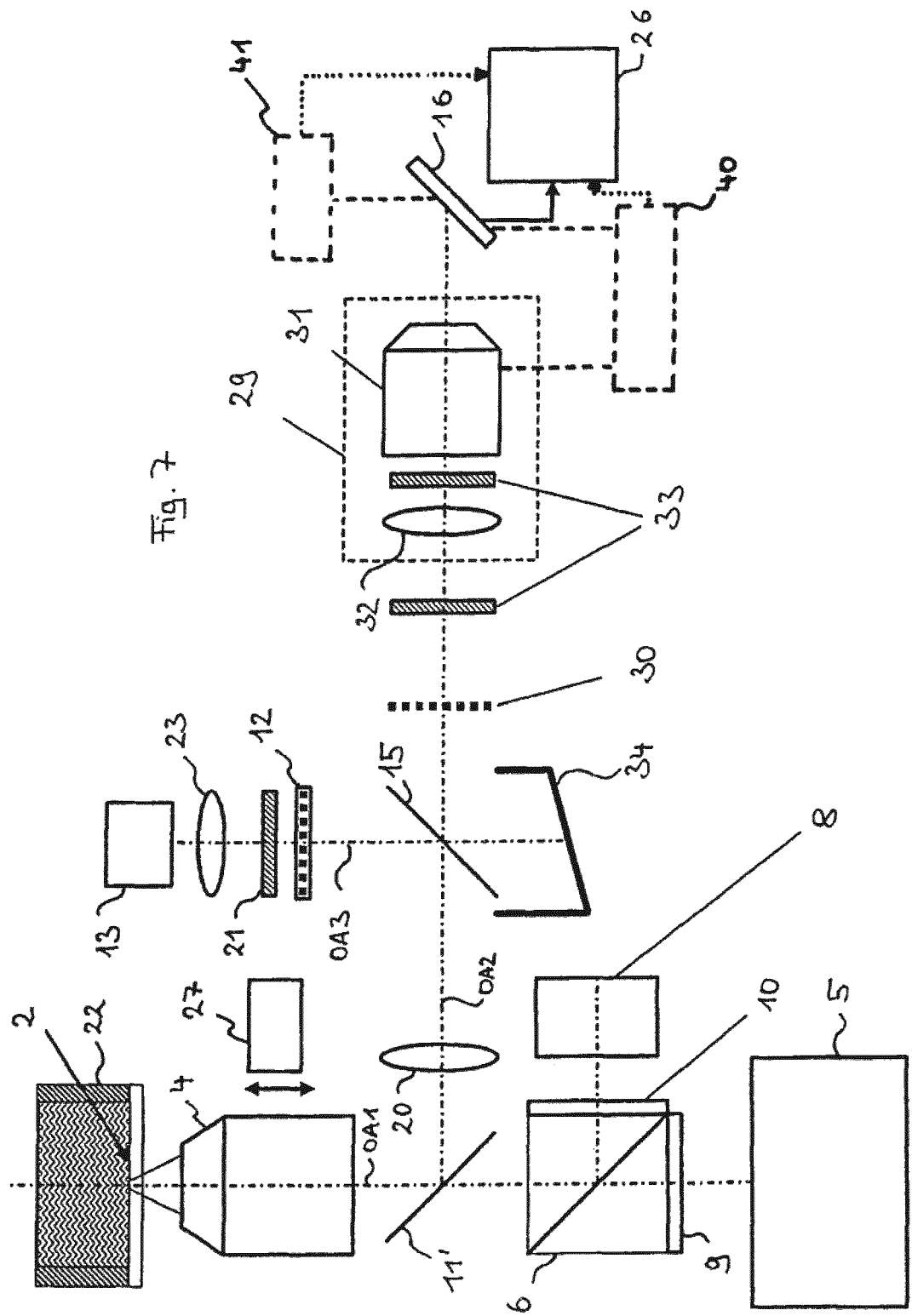

FIG. 7 shows a further design of a microscope with an autofocus device. Components which correspond, in terms of their function and/or structure, to elements from already described microscopes are again not explained again here, in order to avoid unnecessary repetitions. In the autofocus device of FIG. 7, the camera 16 follows an imaging optical unit 29, with the result that the image of the modulation object in the sample is not imaged directly, but an intermediate image 30 is imaged onto the camera 16. Naturally, this principle, which is shown in FIG. 7 using the example of an inverted microscope, can be used generally. The light modulator designed here as a transmission grating and the intermediate image 30 lie in planes which are conjugated to the sample focal plane as well as to the plane which the camera 16 intersects.

The imaging of the image of the modulation object lying in the sample using the intermediate image 30 has the considerable advantage that the further beam splitter 15, which can e.g., be designed as a 50:50 beam splitter, lies at a great distance from the camera 16.

Any unavoidable scattered light from the further beam splitter 15 thus reaches the camera 16 only via multiple reflections, i.e., greatly weakened. In addition, the intermediate image coupling avoids all reflexes from optical units which are located to the right of the further beam splitter 15, to the camera 16.

In an exemplary design of the autofocus device of the microscope of FIG. 7, an IR-LED the centroid wavelength of which lies above 800 nm, preferably at 830 nm, is used as light source 13. The light source 13 is connected to the control device 26, such that, necessary, the light source will be switched on or off, time-modulated or regulated regarding its brightness.

The light modulator 12 is designed as a slit transmission grating. In order to illuminate the slits as homogeneously as possible and thus to utilize the radiation of the illumination source 13 as efficiently as possible, a collimating optical unit with an anamorphic optical unit 23 which brings about a linear illumination is provided. The light modulator 12 is preceded (alternatively also followed) by the filter 21 which is designed as an IR bandpass filter and is adapted to the centroid wavelength of the IR-LED. The bandpass width lies between 10 and 50 nm, whereby undesired spectral portions of the light source 13 are suppressed.

At the further beam splitter 15, a light trap 34 is provided which absorbs radiation from the light modulator 12 which would be transmitted. The light trap 34 is preferably designed as a sheet of a strongly absorbent material positioned at an angle to the optical axis, e.g., as a polished NG1 sheet. NG1 is a strongly absorbent, black glass.

The dichroic beam splitter 11' reflects only radiation of the wavelength which propagates after the bandpass filter 21 in the autofocus beam path. Other spectral portions are transmitted. To achieve this, the beam splitter 11' has an interference layer which mainly transmits radiation below 800 nm at an angle of incidence of 45 degrees and mainly reflects radiation with the centroid wavelength of the IR-LED. The beam splitter 11' can also have a wedge angle in order to avoid interferences which would be disruptive in a laser scanning microscope, which can be one embodiment of the microscope of FIG. 7. In order to also be able to work with non-linear fluorescence excitation which also uses IR radiation in the microscope for sample imaging, the beam splitter 11' can also have a bandpass-like spectral behavior, with the result that wavelengths above the autofocus spectral range (e.g., above 840 nm) are also largely transmitted at a 45-degree angle of incidence. Naturally, these beam splitter features can also be used in other embodiments.

Furthermore, it is preferably possible to configure the beam splitter so that it can be changed, e.g., by means of a change wheel or another change mechanism.

The imaging of the image of the modulation object formed in the sample or the intermediate image 30 thereof is preceded by bandstop filters 33 which ensure that only radiation of the corresponding autofocus spectral range reaches the camera 16. Other radiation which can originate from the imaging of the sample, e.g., excitation or fluorescence radiation in the case of a laser scanning microscope, is thereby suppressed once again. The imaging optical unit 29 images the image of the modulation object formed in the sample or the intermediate image 30 reflected at a boundary surface, e.g., the glass/liquid boundary surface, onto the camera 16. The imaging optical unit 29 can be constructed, e.g., from a tube lens 32 and a standard objective 31 with small numerical aperture (e.g. NA=0.2).

Figure 8:
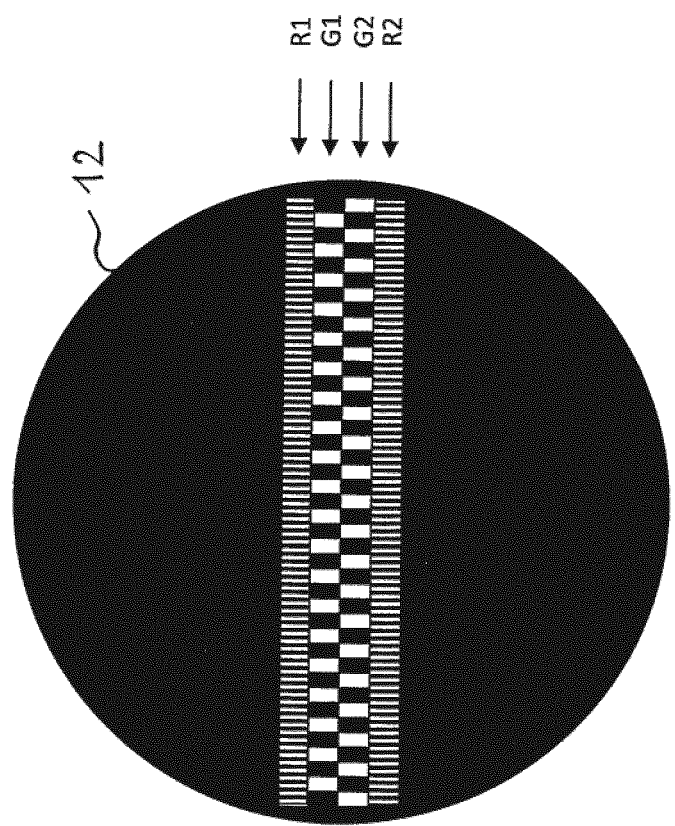

FIG. 8 shows a top view of a design of the light modulator 12 for generating the modulation object, which is here designed as a grating slit G1. The imaging of the grating slit G1 generates striped contours in the sample. Alongside the grating slit G1, there is additionally a further grating slit R1 which is designed as a comparison object with which the lateral reflectivity distribution of the sample is measured directly next to the point at which the grating slit G1 is imaged to the sample. Using the measured reflectivity distribution, the signal, i.e., the intensity distribution of the imaging of the grating G1, is normalized in order to eliminate the influence of reflectivity fluctuations of the sample 2 computationally.

The grating slit R1 has a grating frequency which is so high that it can no longer be resolved by the optical unit. The image of the grating slit R1 in the sample 2 is thus not structured. As the duty cycle of the grating slit R1 corresponds to that of the grating slit G1, the amount of light that passes into the sample through the grating slit R1 during the imaging is equal to the amount of light that passes onto the sample during the imaging of the grating slit G1. The intensity pattern along the image of the grating slit G1 can thereby be corrected particularly easily by means of the intensity pattern along the image of the grating slit R1.

Figure 9:
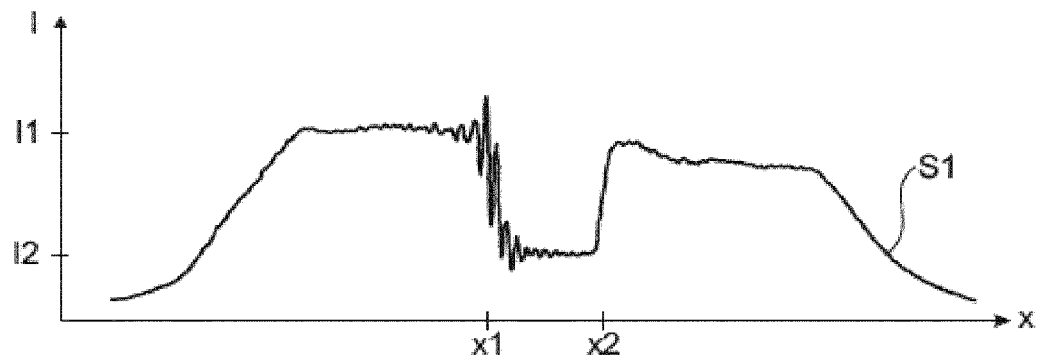
Figure 11:
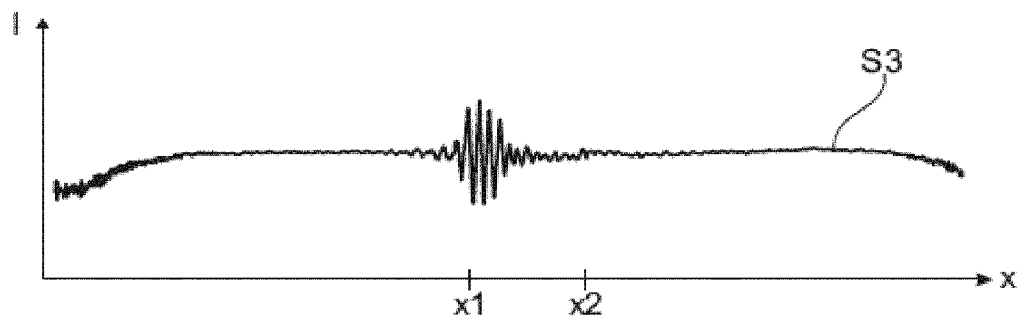

The result is shown using FIG. 9. This represents the intensity pattern of the reflected radiation of the image of the grating slit G1 as curve S1. It can be seen that the intensity of the reflected radiation falls from a plateau I1 to a value I2 and then rises again. This pattern is caused by a lower reflectivity of the sample 2 between the points x1 and x2. The image of the grating slit R1 serving as a comparison object reproduces this pattern exactly (not shown), but without the modulation in the area of point x1. If the signal of the curve S1 is normalized with the intensity pattern of the image of the grating slit R1, the signal according to curve S3 represented in FIG. 11 is obtained. The modulation in the area of point x1, which is caused by the modulation object in the form of the grating slit G2, is now clearly recognizable and can be used to generate an autofocus signal.

Figure 10:
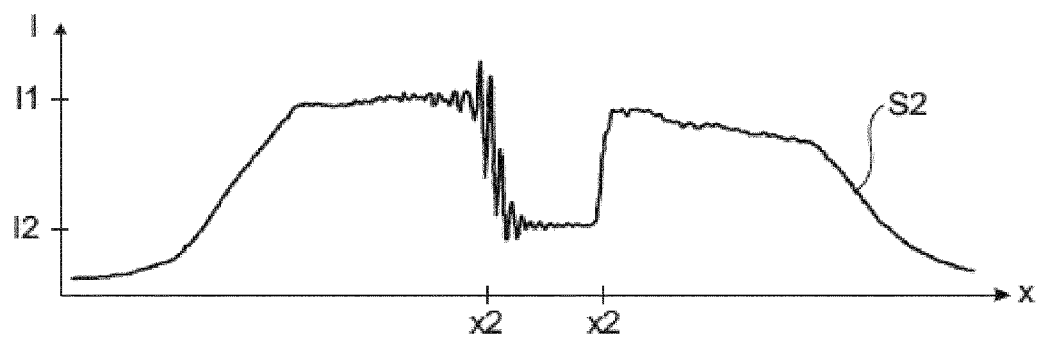

The top view of the light modulator 12 which is represented in FIG. 8 shows yet another grating slit G2 which corresponds to the grating slit G1 apart from a phase shift of 180 degrees. In this embodiment, the normalization can also take place by a reference to the combined intensity of the images of the grating slits G1 and G2. This is shown by FIG. 10, which, on a curve S2, shows the signal which is obtained in the evaluation of the intensity pattern along the grating slit G2. Adding these two signals gives a variable which, when utilized as normalization for the signal that was obtained from the image of the grating slit G1 or the image of the grating slit G2, also results in the signal pattern according to curve S3 of FIG. 11. It is essential for this that the grating slit that is used as modulation object (for example the grating slit G1) is combined with a structure that complements it (for example, grating slit G2), with the result that the intensity distribution of the image of the modulation object combined with the image of the structure that complements it corresponds to a continuous slit. The structure of the modulation object repeated at a phase shift of 180 degrees for generating a comparison object is to be understood only as exemplary. In principle, it suffices if the structure which, together with the modulation object, forms the comparison object is inverse to the modulation object.

The light modulator 12 of FIG. 8 thus offers the following options for eliminating reflectivity variations of the sample 2 by means of normalization:
1. G1/(G1+G2)
2. G2/(G1+G2)
3. G1/R1
4. G2/R1
5. G1/R2
6. G2/R2.

In this list, the reference numbers of the corresponding grating slits are used as symbols for the intensity distribution of the images of these grating slits in the sample 2 measured by means of the autofocus camera.

Naturally, the intensity distributions can also be provided with a suitable prefactor; for example, in the cases in which the modulation object is combined with a structure that complements it a corresponding prefactor which takes into account the different light intensity between modulation object and comparison structure can be used in the normalization.

The grating slits shown in FIG. 8 are to be seen as merely exemplary. In principle, a modulation object with a further structure which, either alone or in combination with the modulation object, represents the comparison structure suffices. However, the use of additional modulation structures or grating slits, as in FIG. 8, increases the precision and robustness of the method.

The light modulator 12 also need not, as shown in FIG. 8, be designed as a static structure. It can be realized by means of a correspondingly controllable element which provides the modulation structure and the additional structures for the comparison structure. This can also take place sequentially in principle. This has the advantage that comparison structure and modulation structure can be imaged into the sample 2 exactly at the same point, with the result that the inherently small offset between comparison structure and modulation structure which exists for example between the grating slits G1 and R1 of FIG. 8 is also eliminated. Thus, it is absolutely impossible for the reflectivity of the sample to vary locally between the images of the modulation object and the comparison object.

The areas on the autofocus camera allocated to the modulation and comparison objects respectively can preferably consist of several columns and rows, with the result that an average can be taken over several columns or rows to minimize noise.

The capture range of the autofocus system is predetermined by the range of the z-shift of the objective 4 (or the boundary surface) in which a contrast signal that can still be evaluated is present on the autofocus camera. Two conditions have to be met for this:
1. The contrast signal has to be located inside the image field.
2. The contrast signal has to have a sufficient signal level which lies significantly above the noise level.

The holding area in which the focus can be held by readjustment is limited by the maximum allowable range of the z-shift of the focal plane into the sample. For the case that the contrast focus is located in the center of the image field, if the focal plane of the microscope objective 4 lies precisely on the boundary surface, the holding area is precisely half as large as the capture range.

In a digital signal resolution of 8 bit (256 steps), a contrast level of 30 can only just be meaningfully evaluated. For this reason, the image field size on the autofocus camera positioned at an angle must be chosen such that, at the edge of the capture range, the contrast level only just suffices. The size of the camera is correspondingly adapted.

A development is therefore optionally provided which is drawn in by way of example as a dotted line in FIG. 7. A lengthwise adjustment mechanism 40 is provided there which varies the distance between autofocus objective 31 and autofocus camera 16. For this, the objective 31 can optionally be moved relative to the fixed camera 16 or the camera 16 can be moved relative to the fixed objective 31 along the optical axis. For the preferably electronically controlled length adjustment mechanism, all known drive technologies are suitable, such as spindle drives, stepping motors, direct-current motors, piezo actuators, etc. The variation of the distance between autofocus objective 31 and camera 16 is only one example of the general principle of length adjustment of camera 16 relative to the image plane of the autofocus imaging. In the simplest case, the longitudinal shifting mechanism can effect a shift of the camera 16, the imaging optical unit 29 or the light modulator 12.

This development removes the described limitation of the capture range or holding area.

The distance between autofocus objective and autofocus camera is now adapted to the desired holding area such that the focus of the contrast signal always lies in the center of the image field. For this, the steps described in WO 2007/144197 A are carried out.

In principle, the structured autofocus illumination, e.g., by means of LCD or DMD, can also be realized with a transmitted light microscope and/or as dark field illumination. However, in the case of transmitted light, use is then limited to transparent sample holders as well as to scattering or fluorescent samples.

In all variants of the autofocus and tracking system, a computational control and evaluation device (e.g., a computer) is used which carries out the signal analysis and the control of the actuator(s) (z-drive, xy-table, filter, etc.). Evaluation and control can be implemented by firmware and/or software technology. This control/evaluation device carries out all sequential control described here.

Instead of adjustable, e.g., electrically switchable, light modulators (e.g., LCD, DMD), static light modulators (transmission or phase gratings) can also be used. The projected modulation object can be shiftable on the sample side using tiltable plane-parallel plates or other devices. An exchange of the gratings can likewise be possible to vary the grating constants or structure. As explained, a two-dimensional grating structure can also be used which has several different grating periods, for example 2 to 10 striped gratings arranged next to each other with different grating frequencies. Depending on the design, each structure can be provided with a comparison object of its own or also several or all of the grating structures can be provided with a common comparison object.

As the autofocus method can preferably (but not necessarily) function with two-dimensional (field) cameras, the most suitable grating for each application case can then be chosen in the case of several grating lines by reading the corresponding camera lines, without the need to carry out mechanical changes (e.g., exchange of the grating).

The described principle of the light modulator which provides a modulation structure and a comparison structure can be used not only in a microscope such as described by WO 2007/144197 A1, but a microscope with the design according to DE 10319182 A1 also comes into consideration. The disclosure of this published document, DE 10319182 A1, is therefore incorporated by reference in full in this respect. The modulation structure and the structure necessary for the comparison structure are then located on an edge of a confocal slit diaphragm running at an angle. The imaging of the modulation object as well as of the comparison object thus takes place mostly through the beam path which is also provided for the sample imaging in the microscope.

Where method steps or particular methods or modes of operation are described in this description, these are realized by a control device belonging to the autofocus device, e.g., like in the control device 26. Naturally, a control device present in any case in the microscope 1 can also undertake the corresponding control tasks.

The invention claimed is:

1. A microscope with an objective, which has a focal plane lying in a sample space, and an autofocus device having:
   a light modulator which is designed for generating a luminous modulation object that is intensity-modulated periodically along one direction and for additionally generating a luminous comparison object which extends along the direction of the modulation object,
   an autofocus illumination optical unit which images the modulation object and the comparison object such that an image of the modulation object and an image of the comparison object are formed in the sample space,
   an autofocus camera,
   an autofocus imaging optical unit which images the image of the modulation object and the image of the comparison object both formed in the sample space onto the autofocus camera,
   a control device which receives signals of the autofocus camera and is designed:
      to determine an intensity distribution of the image of the modulation object and an intensity distribution of the image of the comparison object along the direction,
      to determine, on a basis of the intensity distribution of the image of the comparison object, a corrected intensity distribution of the image of the modulation object which corrected intensity distribution is corrected with regard to reflectivity variations in the sample space, and
      to generate a focus control signal the corrected intensity distribution of the image of the modulation object,
      wherein the comparison object comprises a grating slit, a grating constant of which lies below a resolution limit of the autofocus imaging optical unit.

2. The microscope according to claim 1, wherein the comparison object comprises an unstructured line or an unstructured rectangular field.

3. The microscope according to claim 1, wherein the modulation object comprises a grating slit, wherein a duty cycle and slit width of the grating slit of the modulation object and of the comparison object are substantially the same.

4. The microscope according to claim 1, wherein the comparison object is formed by a combination of modulation object with a structure that is complementary to the modulation object.

5. The microscope according to claim 1, wherein the control device is adapted to image the images of comparison object and modulation object sequentially and to determine the intensity distributions sequentially.

6. The microscope according to claim 1, wherein the autofocus device operates in a spectral range which is not used for imaging of the sample space.

7. An autofocus method for a microscope with an objective which images a sample, wherein the method comprises the steps of:
- imaging onto the sample a luminous modulation object that is intensity-modulated periodically along one direction and forming an image of the modulation object in the sample,
- determining an intensity distribution of the image of the modulation object,
- imaging onto the sample a luminous comparison object which extends along the direction of the modulation object and forming an image of the comparison object in the sample, and
- determining an intensity distribution of the image of the comparison object along the direction,
- determining, on basis of the intensity distribution of the image of the comparison object, a corrected intensity distribution of the image of the modulation object which corrected intensity distribution is corrected with regard to reflectivity variations of the sample, and
- generating a focus control signal from the corrected intensity distribution,
- wherein the comparison object comprises a grating slit, a grating constant of which lies below a resolution limit of the autofocus imaging optical unit.

8. The autofocus method according to claim 7, wherein the comparison object comprises an unstructured line or an unstructured rectangular field.

9. The autofocus method according to claim 1, wherein the modulation object comprises a grating gap, wherein a duty cycle and grating gap width of the grating gap of the modulation object and of the comparison object are substantially the same.

10. The autofocus method according to claim 7, wherein the comparison object is formed by a combination of the modulation object with a structure that is complementary to the modulation object.

11. The autofocus method according to claim 7, wherein the images of the comparison object and modulation object are imaged sequentially and the intensity distributions are determined sequentially.

12. The autofocus method according to claim 7, wherein the steps of imaging onto the sample the luminous modulation object, determining the intensity distribution of the image of the modulation object, and imaging onto the sample the luminous comparison, are done in a spectral range which is not used for imaging of the sample space.

* * * * *